Jan. 28, 1964   R. GOTTSCHALD   3,119,634
BALL JOINTS
Filed Feb. 2, 1961

3,119,634
BALL JOINTS
Rudolf Gottschald, Osterrath, Germany, assignor to
A. Ehrenreich & Cie
Filed Feb. 2, 1961, Ser. No. 86,715
Claims priority, application Germany Feb. 4, 1960
5 Claims. (Cl. 287—87)

This invention relates to ball joints, particularly those for use in steering linkages and wheel suspensions of motor vehicles, comprising a casing, a pivot ball mounted therein with a part-spherical surface of contact and a cover on the casing which is held in position by a rolling operation. Joints of this kind are mass produced but must be manufactured very accurately. However, accuracy is difficult to achieve because of the high numbers produced, and all the more so because it leads to extra costs.

Ideally, a ball joint should be without play in all directions, even when loaded. Freedom from play can be achieved by a spring which acts upon one ball shell, but when a load is applied to the joint the spring yields since it is small and the forces which it can exert are small. The purpose of the spring, therefore, apart from compensating for wear when a ball shell is replaced, is mainly to serve as a way of ensuring that a series of joints function in more or less the same way, but the spring does not lead to freedom of play in a loaded joint, because all the components forming part of a joint vary differently from one another in some ranges of tolerance, with the result that the tolerances may occasionally be such that the complete joint would have play if no spring were provided, and in another case may be too difficult to move.

It is an object of the invention to provide a joint in which the ball head is definitely free from clearance after the rolling operation independently of whether or not the permissible tolerances of the components used to form the joint coincide—i.e., the ball head cannot deviate against the spring pressure. To this end, according to the invention, a malleable insert, for instance, of plastic or soft metal, is provided below the casing cover or, in the case of a divided ball head, between the parts thereof, the insert being deformed, when the casing cover is rolled in, so that the ball head is everywhere in engagement with the casing without clearance.

Some examples of ball joints in accordance with the invention are illustrated in the accompanying drawings in which.

Figure 1:
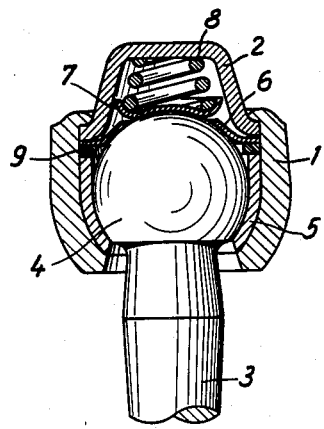
FIGS. 1 and 2 are sections of ball joints in which an insert is provided between the casing cover and the bottom shell against which the ball bears.

In all the figures the joint comprises a ball casing 1, a casing cover 2, a ball pin 3, a ball head 4 and a bottom ball shell 5.

Referring to FIG. 1, a top ball shell 6 formed with a central aperture is disposed below the casing cover 2. The central aperture receives a resilient dished member 7 which is forced into engagement with the ball head 4 by a coiled spring 8. A malleable insert 9 made of plastic or a soft metal, such as lead or copper or the like, is disposed below the casing cover. The insert 9 provides some resistance to the rolling of the lip which holds the cover 2, but can be deformed. The insert 9 flows until the bearing shell 6 engages with the ball head 4. In contrast to the conventional method, therefore, in which rolling is performed against a rigid support surface, the invention provides a plastically deformable support surface. The play in a joint has heretofore depended only upon the tolerance of its constituent parts, but according to the invention variations can be obviated by an appropriate rolling operation, since the insert 9 can be squeezed away as required.

Figure 2:
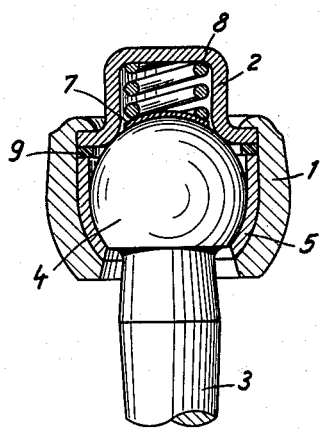

Referring to FIG. 2, the bearing shell 6 is omitted since the casing cover forms an annular bearing surface for the ball head 4 to limit axial movement thereof. For the rest, the operation of the insert 9 is as described with reference to FIG. 1. In both FIGS. 1 and 2 the spring 8 starts to operate only when the ball head 4, shell 5, bearing shell 6, or casing cover 2 have worn after prolonged operation.

Figure 3:
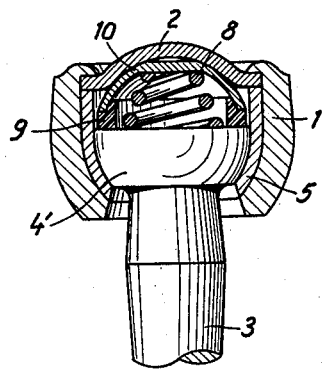
FIG. 3 is a section of a joint having a divided ball head, an insert being provided between the constituent elements of the head.

Referring to FIG. 3, the ball head is of known divided construction and comprises a part-spherical portion 4' and a hollow part-spherical cap 10. Disposed between the part 4' and the cap 10 is an insert 9 which, of course, behaves exactly like the insert 9 shown in FIGS. 1 and 2 when the casing cover 2 is rolled in. In this case the casing cover is rolled against a rigid support surface, but this is not a hindrance since the cap 10 yields to such an extent as the insert 9 flows away that the joint has no play after rolling in but is not locked fast. Here again the spring 8 starts to operate only when the joint starts to wear after prolonged operation.

Figure 4:
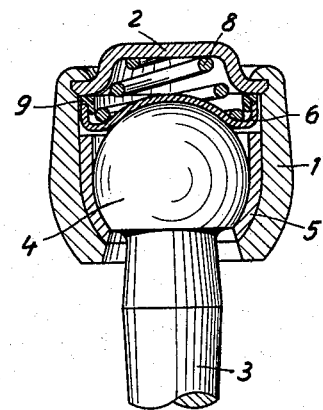
FIG. 4 is a section of a joint in which an insert is provided between the casing cover and the top ball shell.

Referring to FIG. 4, the bearing shell 6 bears against the casing cover 2 by way of the malleable insert 9. The insert 9, which in this case is disposed below the casing cover 2, is deformed during the rolling-in operation until the bearing shell 6 enters into engagement with the ball head 4—i.e., until the ball head is everywhere in engagement with the casing without play.

The insert should be of a size and design such as to deform only when subjected to a force greater than the maximum force acting upon the joint. The joint will then be free from play in all operating conditions. Of course, the force in the rolling operation must be greater than the force required to deform the insert in order that the same may deform when the casing cover is rolled in.

I claim:
1. A ball and socket joint comprising
    an open ended housing having wall means defining the restricted aperture at one open end,
    a first bearing shell disposed in said housing and having a converging bearing surface adjacent said restricted aperture,
    a ball stud having a ball head received in said housing and engaging said converging bearing surface of said first bearing shell,
    said housing having a peripheral lip at the other open end,
    a cover for closing said other open end and having a peripheral flange extending under said peripheral lip.
    a second bearing shell engaging the rounded end portion of said ball member,
    said second bearing shell having a peripheral edge portion extending under said cover flange,
    and a plastically deformable ring member disposed between said peripheral edge portion of said second bearing shell and the inner end of said first bearing shell.

2. A ball and socket joint according to claim 1 wherein said second bearing shell is an annular member having an upwardly concave inner peripheral portion adapted to the curvature of said ball member.

3. A ball and socket joint according to claim 2 wherein a resilient dished member is disposed in said cover and engages said ball member at the central open portion of said second bearing shell.

4. A ball and socket joint according to claim 3 wherein a resilient spring member is disposed between the outer end of said cover and said resilient dished member.

5. A ball and socket joint according to claim 4 wherein said resilient dished member has a central convex portion adapted to the curvature of said ball member.

References Cited in the file of this patent

UNITED STATES PATENTS

| | | |
|---|---|---|
| 1,960,956 | Riedel | May 29, 1934 |
| 2,591,832 | Kogstrom | Apr. 8, 1952 |
| 2,718,418 | Latzen | Sept. 20, 1955 |
| 2,823,055 | Booth | Feb. 11, 1958 |
| 2,853,326 | Booth | Sept. 23, 1958 |
| 2,861,827 | Langen et al. | Nov. 25, 1958 |
| 2,892,246 | Mansfield | June 30, 1959 |

FOREIGN PATENTS

| | | |
|---|---|---|
| 1,094,384 | France | Dec. 8, 1954 |